(12) United States Patent
Yu

(10) Patent No.: US 11,081,849 B2
(45) Date of Patent: Aug. 3, 2021

(54) SLIP RING, MOTOR, AND VEHICLE HAVING SAME

(71) Applicant: LG INNOTEK CO., LTD., Seoul (KR)

(72) Inventor: Hyun Soo Yu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 483 days.

(21) Appl. No.: 15/777,479

(22) PCT Filed: Nov. 7, 2016

(86) PCT No.: PCT/KR2016/012734
§ 371 (c)(1),
(2) Date: May 18, 2018

(87) PCT Pub. No.: WO2017/115997
PCT Pub. Date: Jul. 6, 2017

(65) Prior Publication Data
US 2018/0331482 A1    Nov. 15, 2018

(30) Foreign Application Priority Data

Dec. 29, 2015    (KR) .......................... 10-2015-0188647

(51) Int. Cl.
*H02K 9/06*        (2006.01)
*H02K 5/14*        (2006.01)
(Continued)

(52) U.S. Cl.
CPC ............. *H01R 39/08* (2013.01); *H02K 5/141* (2013.01); *H02K 9/04* (2013.01); *H02K 13/003* (2013.01); *H02K 9/06* (2013.01)

(58) Field of Classification Search
CPC ......... H02K 9/06; H02K 13/003; H02K 29/08
(Continued)

(56) References Cited

U.S. PATENT DOCUMENTS 3,943,698 A  *  3/1976  Ono .................... G04C 13/11
                                                368/204
4,888,507 A  *  12/1989  Plancon .............. H02K 1/2733
                                                310/40 MM
(Continued)

FOREIGN PATENT DOCUMENTS

CN          201436770 U       4/2010
CN          103178658 A       6/2013
(Continued)

OTHER PUBLICATIONS

JP2011205815A (English Translation) (Year: 2011).*
(Continued)

*Primary Examiner* — Quyen P Leung
*Assistant Examiner* — Alexander Moraza
(74) *Attorney, Agent, or Firm* — Saliwanchik, Lloyd & Eisenschenk

(57) ABSTRACT

The present invention relates to a slip ring, a motor, and a vehicle having same, the slip ring comprising: a cylindrical slip ring body; a plurality of blades formed protruding in the lengthwise direction of the slip ring body on an end portion of the slip ring body; and a brush contacting part disposed on the outer circumferential surface of the slip ring body, wherein the slip ring body and the blades are integrally formed. Accordingly, the motor, by means of the rotation of the blades, can dissipate frictional heat generated from friction between a brush and the slip ring and thus reduce the effects of heat, and can also guide and disperse airborne dust generated from friction between the brush and the slip ring to the outside.

15 Claims, 7 Drawing Sheets

(51) Int. Cl.
 H02K 13/00 (2006.01)
 H01R 39/08 (2006.01)
 H02K 9/04 (2006.01)

(58) Field of Classification Search
 USPC .... 310/232, 62, 63, 156.05, 156.08, 156.09, 310/156.11, 156.22
 See application file for complete search history.

(56) References Cited

U.S. PATENT DOCUMENTS

| | | | | |
|---|---|---|---|---|
| 5,550,418 | A | * | 8/1996 | Chung ................... H02K 5/141 310/239 |
| 5,773,906 | A | * | 6/1998 | Mukai .................... H02K 13/02 310/232 |
| 2013/0200757 | A1 | * | 8/2013 | Schroeder ............ H02K 11/215 310/68 B |
| 2015/0381014 | A1 | * | 12/2015 | Lee ......................... H02K 5/18 310/54 |

FOREIGN PATENT DOCUMENTS

| | | | | |
|---|---|---|---|---|
| JP | 2002-233110 | A | | 8/2002 |
| JP | 2004-068986 | A | | 3/2004 |
| JP | 2011-205815 | A | | 10/2011 |
| JP | 2011205815 | A | * 10/2011 | ............. B60L 50/61 |
| JP | 5179892 | B2 | | 4/2013 |
| KR | 10-0558593 | B1 | | 3/2006 |

OTHER PUBLICATIONS

Office Action dated Aug. 2, 2019 in Chinese Application No. 201680066278.6.

International Search Report in International Application No. PCT/KR2016/012734, filed Nov. 7, 2016.

* cited by examiner

SLIP RING, MOTOR, AND VEHICLE HAVING SAME

CROSS-REFERENCE TO RELATED APPLICATIONS

This application is the U.S. national stage application of International Patent Application No. PCT/KR2016/012734, filed Nov. 7, 2016, which claims priority to Korean Application No. 10-2015-0188647, filed Dec. 29, 2015, the disclosures of each of which are incorporated herein by reference in their entirety.

TECHNICAL FIELD

The present invention relates to a slip ring, a motor, and a vehicle having the same.

BACKGROUND ART

A motor is provided with a shaft configured to be rotatably disposed, a rotor coupled to the shaft, and a stator fixed inside a housing, and the stator is installed with a gap along a circumference of the rotor. The motor induces a rotation of the rotor by an electrical interaction between the rotor and the stator.

When a coil is wound on the rotor, a commutator and a brush are provided to supply a current to the coil wound on the rotor.

Typically, the commutator is coupled to the shaft and is rotated in a state of being connected to the coil, and the brush is coupled to the housing and is disposed to be contactable with the commutator. At this point, the brush is in contact with the commutator to supply electricity thereto. Here, a slip ring may be used as a commutator.

The brush is accommodated in a case and is configured to be pressed in a state of being in contact with the slip ring by being supported on an elastic member which is installed in the case.

However, there is a problem in that frictional heat is generated due to scrubbing between the brush of the motor and the slip ring being rotated in contact with the brush.

Further, there is a problem in that dust is generated inside the motor by the brush and the slip ring being rotated in contact with the brush, and thus a short-circuit is caused by the dust.

DISCLOSURE

Technical Problem

To solve the above-described problems, the present invention is directed to providing a slip ring and a motor having the same which are capable of reducing thermal effect by dissipating frictional heat caused by scrubbing between a brush and the slip ring as well as inducing or dispersing dust, which is generated by the scrubbing between the brush and the slip ring, to the outside.

It should be noted that objects of the present invention are not limited to the foregoing objects, and other objects of the present invention will be apparent to those skilled in the art from the following descriptions.

Technical Solution

One aspect of the present invention provides a slip ring including a cylindrical slip ring body, a plurality of blades formed to protrude from an end of the slip ring body in a length direction of the slip ring body, and a brush contact part disposed on an outer circumferential surface of the slip ring body, wherein a first angle between an imaginary line extending from an outer end of each of the plurality of blades and a tangent line of a first imaginary circle is larger than a second angle between an imaginary line extending from an inner end of each of the plurality of blades and a tangent line of a second imaginary circle, centers of the first imaginary circle and the second imaginary circle are identical to a center of the slip ring body, the tangent line of the first imaginary circle is a tangent line at a point where the first imaginary circle and the outer end meet, and the tangent line of the second imaginary circle is a tangent line at a point where the second imaginary circle and the inner end meet.

The first imaginary circle may be a circle connecting the outer ends of the plurality of blades, and the second imaginary circle may be a circle connecting the inner ends of the plurality of blades.

The first angle may be in a range of 50° to 60°, and the second angle may be in a range of 25° to 35°.

The plurality of blades may be inclined in a rotational direction of the slip ring body based on a radial direction of the slip ring body.

The plurality of blades may be inclined in a direction opposite a rotational direction of the slip ring body based on a radial direction of the slip ring body.

Another aspect of the present invention provides a slip ring including a cylindrical slip ring body, a plurality of blades formed to protrude from an end of the slip ring body in a length direction of the slip ring body, and a brush contact part disposed on an outer circumferential surface of the slip ring body, wherein a coupling hole is formed at a center of the slip ring body, and an inner end of each of the plurality of blades is disposed and spaced apart from the coupling hole.

An outer end of each of the plurality of blades may be disposed and spaced apart from an edge of an outer circumferential surface of the slip ring body to the outside.

Still another aspect of the present invention provides a slip ring including a cylindrical slip ring body, a plurality of blades formed to protrude from an end of the slip ring body in a length direction of the slip ring body, and a brush contact part disposed on an outer circumferential surface of the slip ring body, wherein, as the slip ring body is rotated, air located inside each of the plurality of blades moves outside of each of the plurality of blades.

Yet another aspect of the present invention provides a motor including a stator, a rotor disposed inside the stator, a shaft coupled to the rotor, and a slip ring disposed on an outer circumferential surface of the shaft, wherein the slip ring includes a cylindrical slip ring body, and a plurality of blades formed to protrude from an end of the slip ring body, wherein the slip ring body and the plurality of blades are integrally formed.

The motor may further include a bushing magnet assembly disposed at an end of the shaft and disposed to be spaced apart from an inner end of the each of the plurality of blades.

The bushing magnet assembly may include a bushing, a magnet disposed at an end of the bushing, and a cap configured to cover the magnet.

The magnet may be provided as a samarium cobalt (SmCo) magnet or a neodymium (Nd) magnet.

The motor may further include a brush holder disposed to cover the bushing magnet assembly and having an inlet hole formed at one side of the brush holder.

By the plurality of blades being rotated according a rotation of the shaft, air flowing into the inlet hole may move between the plurality of blades and the bushing magnet assembly and then move in a direction perpendicular to a shaft direction of the shaft.

An outer end of each of the plurality of blades may be disposed and spaced apart from an inner surface of the brush holder.

The air moving in the direction perpendicular to the shaft according to the rotation of the shaft may move in a direction of the slip ring body.

Yet another aspect of the present invention provides a vehicle including the above-described motor according to the embodiments of the present invention.

Advantageous Effects

According to the present embodiments, a slip ring having the foregoing configuration may be operated as a centrifugal fan by being integrally formed with blades.

Accordingly, a flow of air inside a motor is generated such that dust, which is generated by scrubbing between a brush and a slip ring being rotated in contact with the brush, can be induced or dispersed to the outside.

Further, since a temperature inside the motor is raised by frictional heat caused by a rotational contact between the brush and the slip ring and by application of a current, a rise in temperature inside the motor can be inhibited by a flow of air such that thermal effect on a magnet disposed inside the motor can be reduced.

MODES OF THE INVENTION

Figure 1:
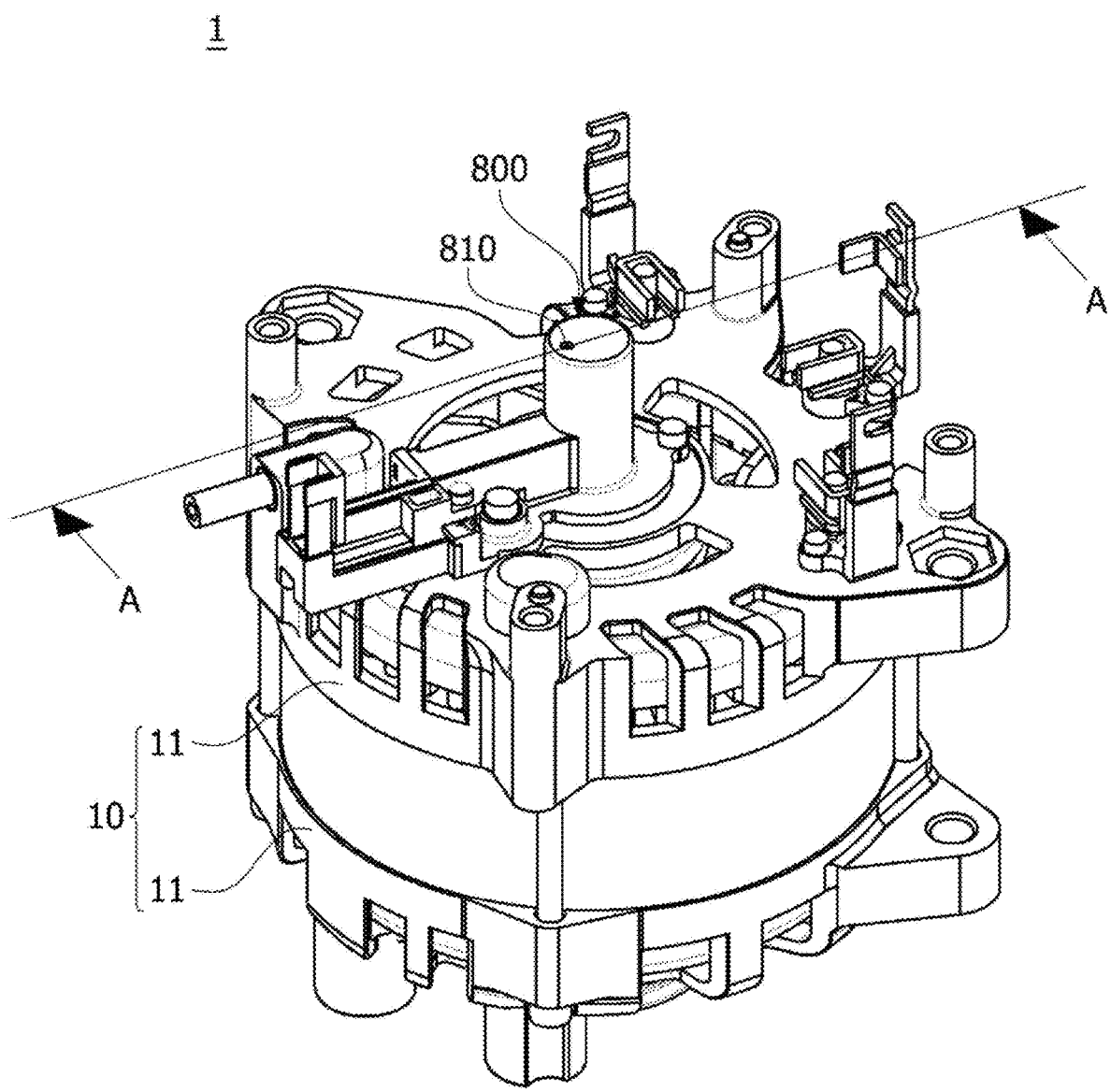
FIG. 1 is a diagram illustrating a motor according to an embodiment of the present invention.

The present invention may be modified into various forms and may have a variety of embodiments, and, therefore, specific embodiments will be illustrated in the drawings and described. The embodiments, however, are not to be taken in a sense which limits the present invention to the specific embodiments, and should be construed to include modifications, equivalents, or substitutions within the spirit and technical scope of the present invention.

Also, the terms including ordinal numbers such as first, second, and the like used herein may be used to describe various components, but the various components are not limited by the terms. The terms are used only for the purpose of distinguishing one component from another component. For example, without departing from the scope of the present invention, a second component may be referred to as a first component, and similarly, a first component may also be referred to as a second component. The term "and/or" includes a combination of a plurality of related listed items or any one item of the plurality of related listed items.

When a component is referred to as being "connected," or "coupled" to other component, it may be directly connected or coupled to the other component, but it should be understood that another component may exist between the component and the other component. Contrarily, when a component is referred to as being "directly connected," or "directly coupled" to other component, it should be understood that another component may be absent between the component and the other component.

In the description of the embodiments, when a component is described as being formed "on or under" another component, the term "on or under" includes all cases in which two components are in direct contact with each other, or one or more other components are disposed (indirectly) and formed between the two components. Also, when expressed as "on or under," the term "on or under" may mean not only an upward direction but also a downward direction based on one component.

The terms used herein are employed to describe only specific embodiments and are not intended to limit the present invention. Unless the context clearly dictates otherwise, the singular form includes the plural form. It should be understood that the terms "comprise," "include," and "have" specify the presence of stated herein features, numbers, steps, operations, components, parts, or combinations thereof, but do not preclude the presence or possibility of adding one or more other features, numbers, steps, operations, components, parts, or combinations thereof.

Unless otherwise defined, all terms including technical or scientific terms used herein have the same meaning as commonly understood by those skilled in the art to which the present invention pertains. General terms that are defined in a dictionary shall be construed to have meanings that are consistent in the context of the relevant art and will not be interpreted as having an idealistic or excessively formalistic meaning unless clearly defined in this disclosure.

Hereinafter, embodiments of the present invention will be described in detail with reference to the drawings, the same reference numerals are given to the same or corresponding components regardless of reference numerals, and a repetitive description thereof will be omitted.

Referring to FIGS. 1 to 7, a motor 1 according to an embodiment may include a housing 10, a slip ring 100, a stator 200, a rotor 300, a coil 400, a shaft 500, a brush 600, a bushing magnet assembly 700, and a brush holder 800.

The housing 10 may include an upper housing 11 and a lower housing 12.

Figure 2:
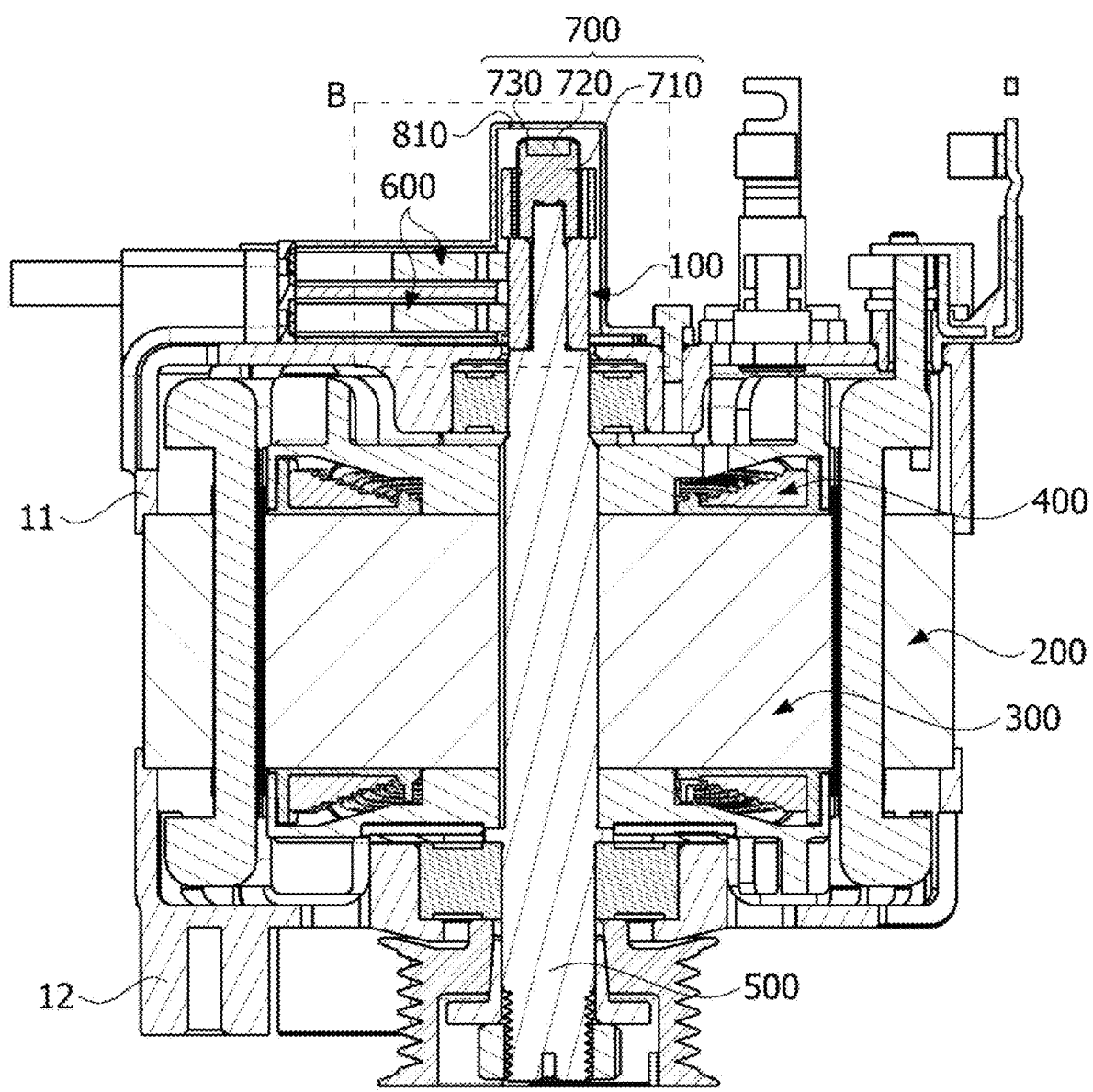
FIG. 2 is a cross-sectional view of the motor according to the embodiment of the present invention taken along line A-A of FIG. 1.

The upper housing 11 and the lower housing 12 may be coupled to each other to form an exterior of the motor 1. Further, the slip ring 100, the stator 200, the rotor 300, the coil 400, the shaft 500, the brush 600, and the bushing magnet assembly 700 may be disposed between the upper housing 11 and the lower housing 12. As shown in FIGS. 1 and 2, the shaft 500 may be disposed to pass through the housing 10.

The slip ring 100 may be disposed at an outer circumferential surface of the shaft 500.

Figure 3:
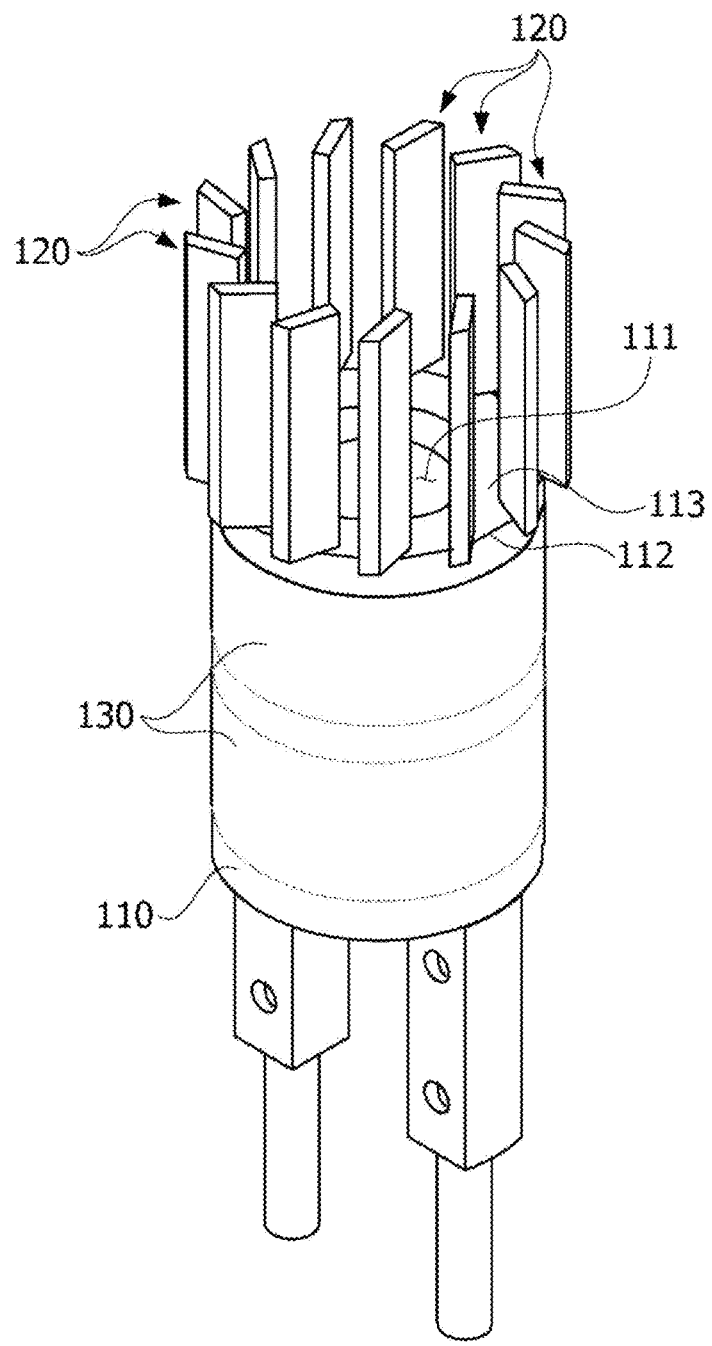
FIGS. 3 and 4 are a perspective view and a plan view illustrating a slip ring according to the embodiment of the present invention.
Figure 4:
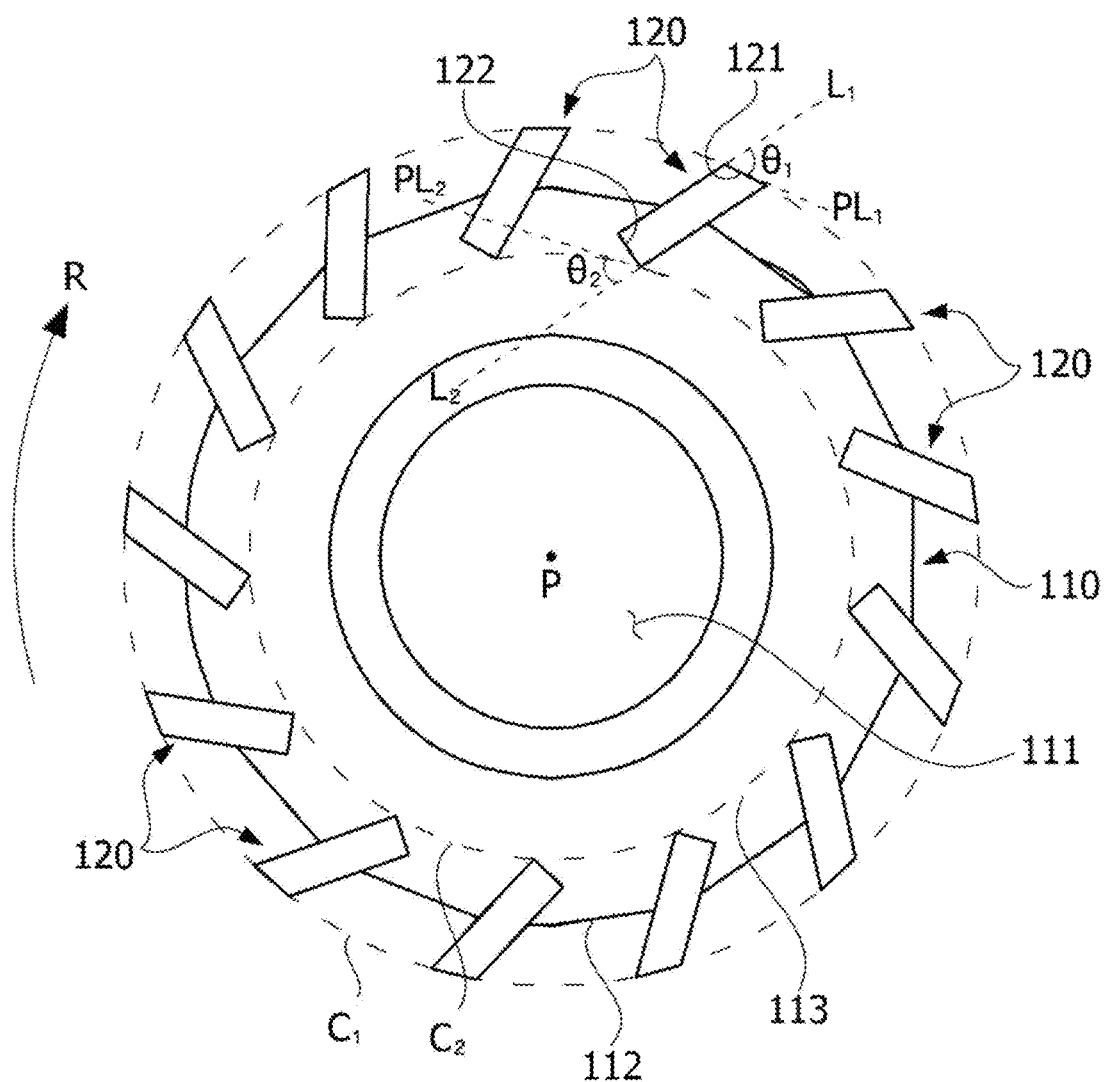

Referring to FIGS. 3 to 4, the slip ring 100 may include a slip ring body 110, a plurality of blades 120, and a brush contact part 130.

The slip ring body 110 may be formed in a cylindrical shape, and a coupling hole 111 may be formed at a center of the slip ring body 110 to allow the shaft 500 to be disposed thereat.

Figure 5:
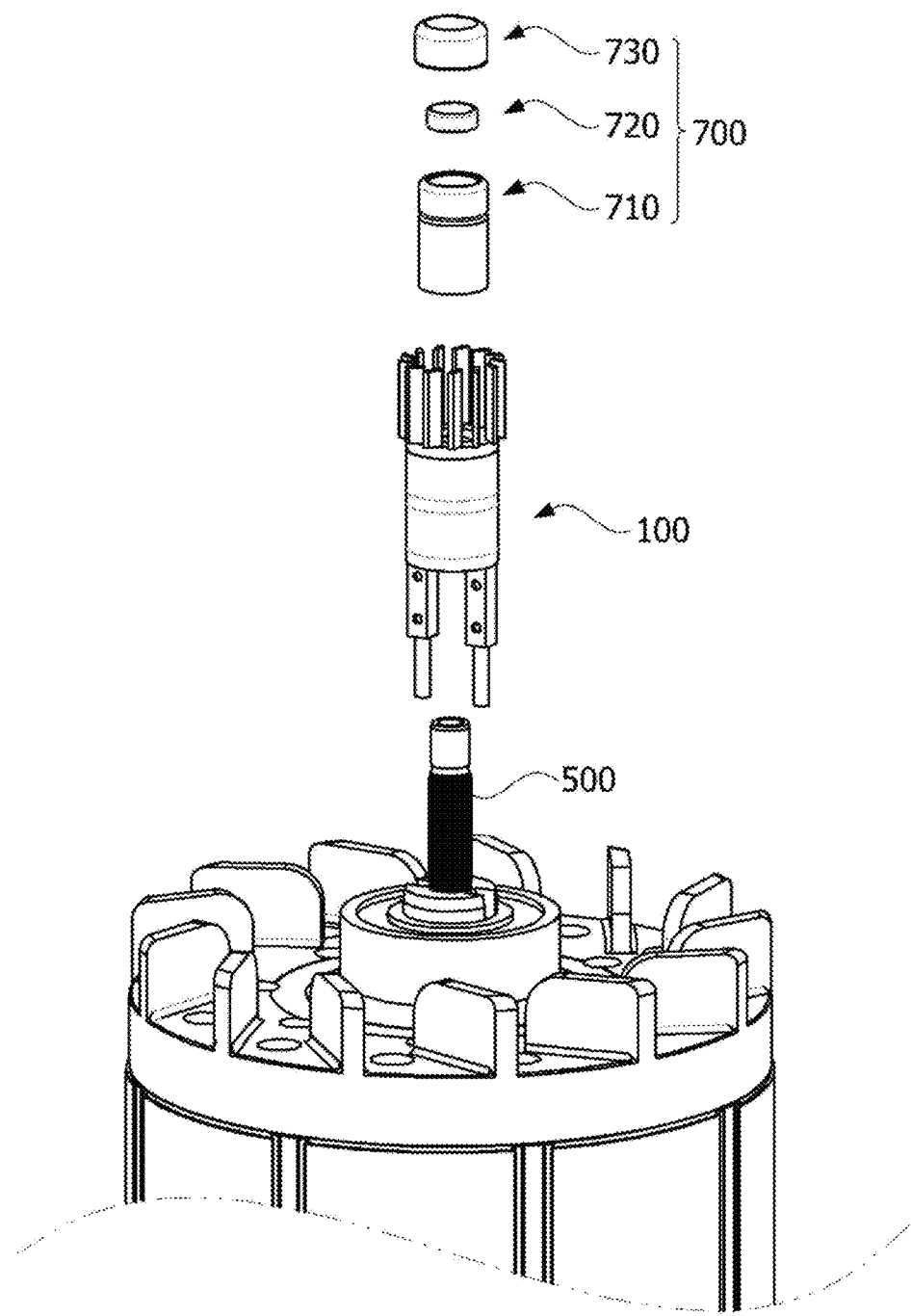
FIG. 5 is a diagram illustrating a process of assembling the slip ring and a bushing magnet assembly into the motor according to the embodiment of the present invention.

As shown in FIG. 5, the slip ring body 110 may be press-inserted and assembled into the shaft 500 to be rotated according to a rotation of the shaft 500.

Further, the slip ring body 110 may be formed of a plastic material having heat resistance such as polyphenylene sulfide (PPS).

The plurality of blades 120 may be integrally formed to protrude from an end of the slip ring body 110 in a length direction thereof. Further, the plurality of blades 120 may be spaced apart from each other along a circumferential direction at predetermined intervals.

Referring to FIG. 4, the plurality of blades 120 may be disposed on an upper surface 113 of the slip ring body 110, and an inner end 122 of each of the plurality of blades 120 may be disposed and spaced apart from the coupling hole 111. Further, the outer end 121 of each of the plurality of blades 120 may be disposed and spaced apart from an outer circumferential edge 112 of the slip ring body 110 toward an outer side thereof.

As the slip ring body 110 is rotated, air located around the inner end 122 of each of the plurality of blades 120 may be moved to an outer side end of each thereof. That is, as the plurality of blades 120 are rotated, the air located around the inner end 122 of each of the plurality of blades 120 may be moved in a direction perpendicular to a shaft direction of the shaft 500.

Here, the "outer side" refers to an outer side based on the upper surface 113 of the slip ring body 110 in a radial direction based on a rotational center of the shaft 500, and an "inner side" refers to an inner side based on the upper surface 113 of the slip ring body 110 in the radial direction based on the rotational center of the shaft 500.

As shown in FIG. 4, each of the plurality of blades 120 may be formed such that a first angle $\theta_1$ between an imaginary line $L_1$ extending from the outer end 121 and a tangent line $PL_1$ of a first imaginary circle $C_1$ is larger than a second angle $\theta_2$ between an imaginary line $L_2$ extending from the inner end 122 and a tangent line $PL_2$ of a second imaginary circle $C_2$. The first angle $\theta_1$ is an angle of an inlet in which the air is discharged, and the second angle $\theta_2$ is an angle of an outlet in which the air flows.

Here, the first imaginary circle $C_1$ is a circle connecting the outer ends 121 of the plurality of blades 120, and the second imaginary circle $C_2$ is a circle connecting the inner ends 122 of the plurality of blades 120. Thus, centers of the first imaginary circle $C_1$ and the second imaginary circle $C_2$ are identical to a center P of the slip ring body 110.

The first tangent line $PL_1$ of the first imaginary circle $C_1$ may be a tangent line at a point where the first imaginary circle $C_1$ and the outer end 121 of each of the plurality of blades 120 meet, and the tangent line $PL_2$ of the second imaginary circle $C_2$ may be a tangent line at a point where the second imaginary circle $C_2$ and inner end 122 of each of the plurality of blades 120 meet. A tangent line is defined as a line perpendicular to a radius of an imaginary circle at a point where the tangent line meets the imaginary circle.

The plurality of blades 120 may be radially formed based on a center of the upper surface 113. As shown in FIG. 4, each of the plurality of blades 120 may be inclined in a rotational direction R of the slip ring body 110. That is, each of the plurality of blades 120 may be formed to be more inclined in the rotational direction of the slip ring body 110 as each of the plurality of blades 120 extends from the inner end 122 thereof to the outer end 121 thereof on the basis of the drawing. However, the present invention is not limited thereto, and each of the plurality of blades 120 may be formed and inclined in a direction opposite the rotational direction of the slip ring body 110 based on the radial direction of the slip ring body 110.

A spacing between the plurality of blades 120 may be equally spaced apart from each other or may be evenly spaced apart at a particular section. Each of the plurality of blades 120 may be substantially in the form of a straight line but may have a predetermined curvature when satisfying a condition in which the first angle $\theta_1$ is larger than the second angle $\theta_2$.

Table 1 shows a flow rate (a unit is ccm) of a gas flow generated in the motor rotating at a speed of 10000 rpm according to the first angle $\theta_1$ and the second angle $\theta_2$.

TABLE 1

| $\theta_2\backslash\theta_1$ | 50 | 55 | 60 |
|---|---|---|---|
| 25 | 2.4 | 2.5 | 2.65 |
| 30 | 2.3 | 2.78 | 2.7 |
| 35 | 2.7 | 2.34 | 2.79 |

As shown in Table 1, when the first angle $\theta_1$ is in the range of 50° to 60° and the second angle $\theta_2$ is in the range of 25° to 35°, it can be seen that a flow rate of gas increases to about 2.78 ccm, and thus discharge efficiency of air increases.

Further, when each of the plurality of blades 120 is inclined in the rotational direction of the slip ring body 110, it is measured to obtain an excellent effect.

Accordingly, the angles $\theta_1$ and $\theta_2$ of each of the plurality of blades 120 may provide a flow direction of air and control the amount of flow.

Meanwhile, the plurality of blades 120 may be integrally formed with the slip ring body 110. Further, each of the plurality of blades 120 may be formed of a plastic material such as PPS.

The brush contact part 130 may be disposed at an outer circumferential surface of the slip ring body 110.

The brush contact part 130 may be formed in a ring shape or a cylindrical shape. Further, the brush contact part 130 may be formed of a material containing copper. For example, the brush contact part 130 may be formed of a copper alloy or stainless steel.

The stator 200 may be disposed inside the housing 10 and may include a plurality of magnets. The plurality of magnets form a rotating magnetic field together with the coil 400 wound on the rotor 300. These magnets may be arranged such that N poles and S poles are alternately disposed along a circumferential direction based on the center of the shaft 500. Here, the stator 200 may be manufactured by combining a plurality of divided cores or may be manufactured in the form of a single core.

The rotor 300 is disposed inside the stator 200.

The rotor 300 may include a core in which the shaft 500 is coupled to a center thereto and a slot which is formed around the core and on which the coil 400 is wound. At this point, the slot may be disposed to face the stator 200. Further, the coil 400 is wound on each of the slots. Furthermore, an insulator may be installed at the slot to insulate the slot from the coil 400.

When a current is supplied to the coil 400, an electrical interaction between the coil 400 and the magnets of the stator 200 is induced and thus the rotor 300 is rotated. When the rotor 300 is rotated, the shaft 500 is also rotated. At this point, the shaft 500 may be supported on bearings.

Further, as the shaft 500 is rotated, the slip ring 100 may also be rotated.

Meanwhile, the current may be supplied to the coil 400 wound on the rotor 300 by the slip ring 100 and the brush 600. The slip ring 100 is electrically connected to the coil 400 and the brush 600 is electrically connected to the brush contact part 130 of the slip ring 100.

Further, the brush 600 may be disposed in close contact with the brush contact part 130 of the slip ring 100. For example, the brush 600 may be disposed in close contact with the brush contact part 130 of the slip ring 100 using an elastic member such as a coil spring.

Further, the brush 600 may apply an external driving signal to the coil 400.

Here, the brush 600 may be formed of a material containing graphite and copper.

The brush 600 is in contact with the brush contact part 130 of the slip ring 100 being rotated to apply the current, and temperatures of the shaft 500 and the brush 600 increase by the current and frictional heat. Thus, the heat conducted through the shaft 500 may affect a magnet 720 of the bushing magnet assembly 700.

Figure 6:
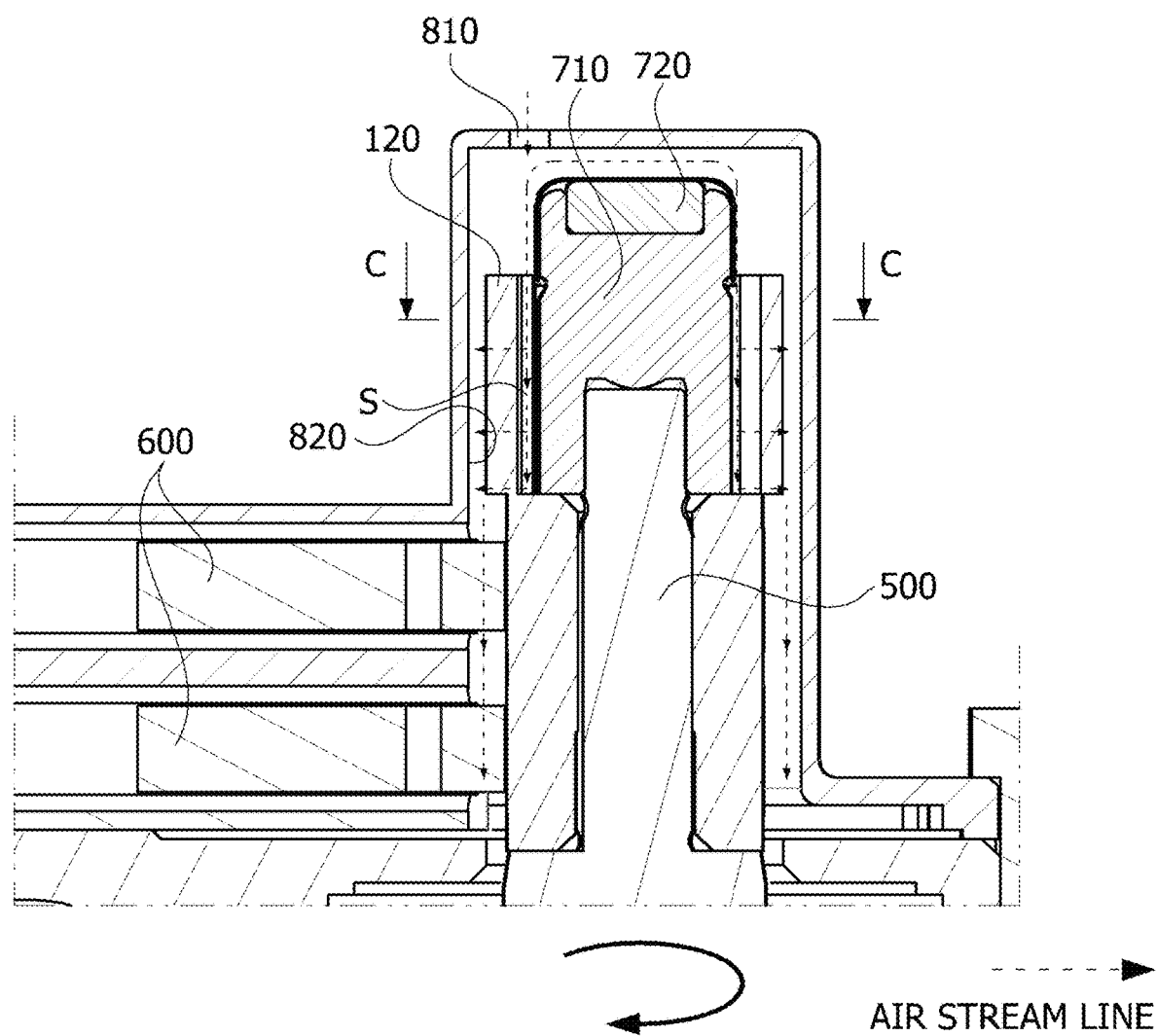
FIG. 6 is an enlarged view of a region B of FIG. 2.
Figure 7:
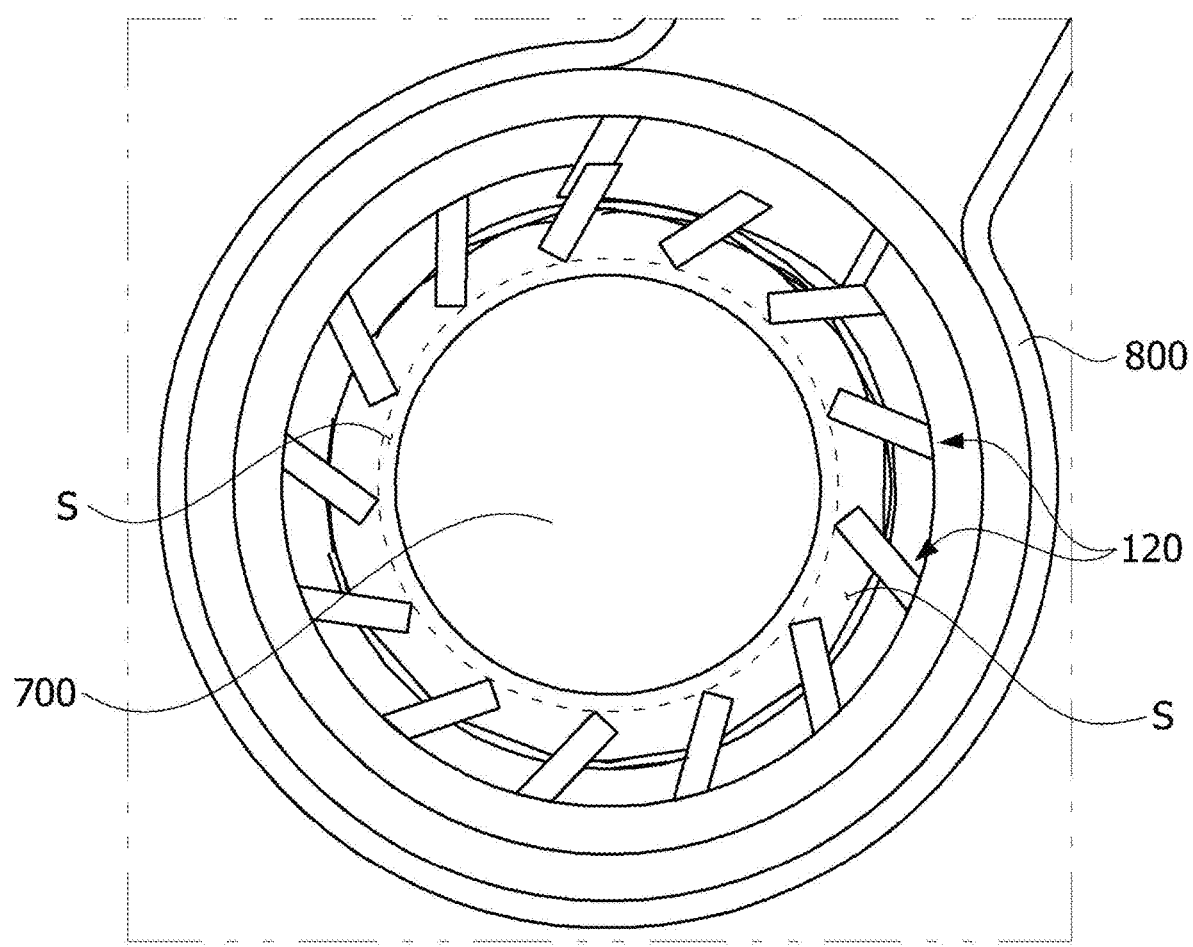
FIG. 7 is a cross-sectional view taken along line C-C of FIG. 6.

As shown in FIGS. 6 and 7, the bushing magnet assembly 700 may be disposed at an end of the shaft 500 and may be spaced apart from the inner end 122 of each of the plurality of blades 120 of the slip ring 100.

Accordingly, a flow space S through which air may move may be formed between each of the plurality of blades 120 of the slip ring 100 and the bushing magnet assembly 700.

Thus, as the plurality of blades 120 are rotated, the air flowing into the flow space S moves outside of the plurality of blades 120 (in a direction perpendicular to the shaft direction of the shaft 500).

Referring to FIGS. 5 and 6, the bushing magnet assembly 700 may include a bushing 710, the magnet 720, and a cap 730.

The bushing magnet assembly 700 may be formed by bonding the magnet 720 to an end of the bushing 710 and fitting the cap 730 into the bushing 710. At this point, the cap 730 is caulked to inhibit the magnet 720 from being separated from the bushing 710.

The assembled bushing magnet assembly 700 may be press-inserted into and disposed at the end of the shaft 500.

The bushing 710 is disposed between the shaft 500 and the magnet 720, and thus the magnet 720 is disposed and spaced apart from the shaft 500. Thus, the heat conducted through shaft 500 to affect the magnet 720 may be reduced by the bushing 710.

Further, an outer circumferential surface of the bushing 710 may be disposed and spaced apart from an inner side of each of the plurality of blades 120 of the slip ring 100. Accordingly, the flow space S may be formed between each of the plurality of blades 120 of the slip ring 100 and the bushing 710.

As the slip ring 100 is rotated, the bushing 710 may be cooled by the air moving through the flow space S, such that the effect on the magnet 720 of the heat conducted through the shaft 500 may be further reduced.

Therefore, a samarium cobalt (SmCo) magnet may be used as the magnet 720, but as described above, since the bushing 710 reduces the thermal effect on the magnet 720, it is possible to reduce a production cost using a low grade SmCo magnet or a Nd magnet as the magnet 720.

The cap 730 may be disposed to cover and protect the magnet 720 and prevent the magnet 720 from being separated from the bushing 710.

The cap 730 may be disposed to cover and protect the magnet 720 and inhibit the magnet 720 from being separated from the bushing 710.

An accommodation space may be formed inside the brush holder 800, and the brush 600 and the bushing magnet assembly 700 may be disposed in the accommodation space.

Meanwhile, as shown in FIG. 6, an inlet hole 810 may be formed at one side of the brush holder 800.

External air may flow into the motor 1 through the inlet hole 810, and the air flowing in through the inlet hole 810 may move between each of the plurality of blades 120 and the bushing magnet assembly 700, and then may move in a direction (the radial direction) perpendicular to the shaft direction of the shaft 500 by the rotations of the plurality of blades 120.

Accordingly, the slip ring 100 may serve as a centrifugal fan.

Further, as shown in FIG. 6, the outer end 121 of each of the plurality of blades 120 may be disposed and spaced apart from an inner surface 820 of the brush holder 800.

Accordingly, the air moving in an outward direction by the rotations of the plurality of blades 120 may move toward the brush 600 to disperse or induce dust to the outside.

Arrows shown in FIG. 6 indicate air stream lines along which the air moves.

Referring to FIG. 6, in the motor 1, the air flowing in through the inlet hole 810 and moving in the flow space S moves outside of each of the plurality of blades 120 by the rotations of the plurality of blades 120 operating as the centrifugal fan.

Thus, the air moving outside of each of the plurality of blades 120 moves toward the slip ring body 110. That is, as shown in FIG. 6, the air moving outside of each of the plurality of blades 120 may disperse or induce dust to the outside to remove the dust while moving toward the brush contact part 130 and the brush 600 which are disposed at the slip ring body 110.

Meanwhile, the motor 1 may be provided at and used in a vehicle (not shown).

For example, the motor 1 may be used as an anti-lock brake system (ABS) motor used in an ABS, a drive motor (start motor) used for starting, or a wiper motor for pivoting a wiper of the vehicle.

Although the description has been made with reference to the embodiments of the present invention, it should be understood that various alterations and modifications of the present invention can be devised by those skilled in the art to which the present invention pertains without departing from the spirit and scope of the present invention, which are defined by the appended claims. Further, it should be construed that differences relating to these various alterations and modifications will fall within the scope of the present invention, which are defined by the appended claims.

DESCRIPTION OF REFERENCE NUMERALS

1: motor, 10: housing, 100: slip ring, 200: stator, 300: rotor, 400: coil, 500: shaft, 600: brush, 700: bushing magnet assembly, 710: bushing, 720: magnet, 730: cap, 800: brush holder, and 810: inlet hole.

The invention claimed is:

1. A slip ring comprising:
a cylindrical slip ring body;
a plurality of blades formed to protrude from an end of the slip ring body in a longitudinal direction of the slip ring body; and
a brush contact part disposed on an outer circumferential surface of the slip ring body,
wherein a first angle ($\theta_1$) between an imaginary line ($L_1$) extending from a side surface including an outer end of each of the plurality of blades and a tangent line ($PL_1$) of a first imaginary circle ($C_1$) is larger than a second angle ($\theta_2$) between an imaginary line ($L_2$) extending from a side surface including an inner end of each of the plurality of blades and a tangent line ($PL_2$) of a second imaginary circle ($C_2$), centers of the first imaginary circle ($C_1$) and the second imaginary circle ($C_2$) are identical to a center of the slip ring body, the tangent line of the first imaginary circle ($C_1$) is a tangent line at a point where the first imaginary circle ($C_1$) and the outer end meet, and the tangent line of the second imaginary circle ($C_2$) is a tangent line at a point where the second imaginary circle ($C_2$) and the inner end meet, wherein each of the plurality of blades is configured to protrude from an outer circumferential edge of the slip ring body in an axial direction of the outer circumferential edge of the slip ring body to outside of the slip ring body such that air or dust is discharged to the outside of the slip ring body, and each of the plurality of blades is inclined in a rotational direction of the slip ring body or a direction opposite to the rotational direction of the slip ring body based on a radial direction of the slip ring body, and wherein the slip ring body and the plurality of blades are integrally formed.

2. The slip ring of claim 1, wherein:
the first imaginary circle ($C_1$) is a circle connecting the outer ends of the plurality of blades; and
the second imaginary circle ($C_2$) is a circle connecting the inner ends of the plurality of blades.

3. The slip ring of claim 1, wherein:
the first angle ($\theta_1$) is in a range of 50° to 60°; and
the second angle ($\theta_2$) is in a range of 25° to 35°.

4. A slip ring comprising:
a cylindrical slip ring body;
a plurality of blades formed to protrude from an end of the slip ring body in a longitudinal direction of the slip ring body; and
a brush contact part disposed on an outer circumferential surface of the slip ring body,
wherein a first angle ($\theta_1$) between an imaginary line ($L_1$) extending from a side surface including an outer end of each of the plurality of blades and a tangent line ($PL_1$) of a first imaginary circle ($C_1$) is larger than a second angle ($\theta_2$) between an imaginary line ($L_2$) extending from a side surface including an inner end of each of the plurality of blades and a tangent line ($PL_2$) of a second imaginary circle ($C_2$),
wherein a coupling hole is formed at a center of the slip ring body, and an inner end of each of the plurality of blades is disposed and spaced apart from the coupling hole,
wherein each of the plurality of blades is configured to protrude from an outer circumferential edge of the slip ring body in an axial direction of the outer circumferential edge of the slip ring body to outside of the slip ring body such that air or dust is discharged to the outside of the slip ring body, and each of the plurality of blades is inclined in a rotational direction of the slip ring body or a direction opposite to the rotational direction of the slip ring body based on a radial direction of the slip ring body, and
wherein the slip ring body and the plurality of blades are integrally formed.

5. The slip ring of claim 4, wherein an outer end of each of the plurality of blades is disposed and spaced apart from an edge of an outer circumferential surface of the slip ring body to the outside.

6. A slip ring comprising:
a cylindrical slip ring body;
a plurality of blades formed to protrude from an end of the slip ring body in a longitudinal direction of the slip ring body; and
a brush contact part disposed on an outer circumferential surface of the slip ring body,
wherein a first angle ($\theta_1$) between an imaginary line ($L_1$) extending from a side surface including an outer end of each of the plurality of blades and a tangent line ($PL_1$) of a first imaginary circle ($C_1$) is larger than a second angle ($\theta_2$) between an imaginary line ($L_2$) extending from a side surface including an inner end of each of the plurality of blades and a tangent line ($PL_2$) of a second imaginary circle ($C_2$),
wherein, as the slip ring body is rotated, air located inside each of the plurality of blades moves outside of each of the plurality of blades,
wherein each of the plurality of blades is configured to protrude from an outer circumferential edge of the slip ring body in an axial direction of the outer circumferential edge of the slip ring body to outside of the slip ring body such that air or dust is discharged to the outside of the slip ring body, and each of the plurality of blades is inclined in a rotational direction of the slip ring body or a direction opposite to the rotational direction of the slip ring body based on a radial direction of the slip ring body, and
wherein the slip ring body and the plurality of blades are integrally formed.

7. A motor comprising:
a stator;
a rotor disposed inside the stator;
a shaft coupled to the rotor; and
a slip ring disposed on an outer circumferential surface of the shaft,
wherein the slip ring includes:
a cylindrical slip ring body; and
a plurality of blades formed to protrude from an end of the slip ring body,
wherein a first angle ($\theta_1$) between an imaginary line ($L_1$) extending from a side surface including an outer end of each of the plurality of blades and a tangent line ($PL_1$) of a first imaginary circle ($C_1$) is larger than a second angle ($\theta_2$) between an imaginary line ($L_2$) extending from a side surface including an inner end of each of the plurality of blades and a tangent line ($PL_2$) of a second imaginary circle ($C_2$),
wherein the slip ring body and the plurality of blades are integrally formed, and
wherein each of the plurality of blades is configured to protrude from an outer circumferential edge of the slip ring body in an axial direction of the outer circumferential edge of the slip ring body to outside of the slip ring body such that air or dust is discharged to the outside of the slip ring body, and each of the plurality of blades is inclined in a rotational direction of the slip ring body or a direction opposite to the rotational direction of the slip ring body based on a radial direction of the slip ring body.

8. The motor of claim 7, comprising a bushing magnet assembly disposed at an end of the shaft, wherein the bushing magnet assembly is disposed and spaced apart from an inner end of the each of the plurality of blades.

9. The motor of claim 8, wherein the bushing magnet assembly includes:
   a bushing;
   a magnet disposed at an end of the bushing; and
   a cap configured to cover the magnet.

10. The motor of claim 8, wherein the magnet is provided as a samarium cobalt (SmCo) magnet or a neodymium (Nd) magnet.

11. The motor of claim 8, comprising a brush holder disposed to cover the bushing magnet assembly and having an inlet hole formed at one side of the brush holder.

12. The motor of claim 11, wherein, by the plurality of blades being rotated according to a rotation of the shaft, air flowing into the inlet hole moves between the plurality of blades and the bushing magnet assembly and then moves in a direction perpendicular to an extension direction of the shaft.

13. The motor of claim 12, wherein an outer end of each of the plurality of blades is disposed and spaced apart from an inner surface of the brush holder.

14. The motor of claim 13, wherein the air moving in the direction perpendicular to the extension direction of the shaft when the rotation of the shaft moves in a direction in which the slip ring body moves.

15. A vehicle comprising the motor according to claim 7.

* * * * *